United States Patent
Chang

(10) Patent No.: US 9,465,906 B2
(45) Date of Patent: Oct. 11, 2016

(54) SYSTEM AND METHOD FOR INTEGRATED CIRCUIT MANUFACTURING

(71) Applicant: Taiwan Semiconductor Manufacturing Company, Ltd., Hsin-Chu (TW)

(72) Inventor: Shih-Ming Chang, Hsinchu County (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 39 days.

(21) Appl. No.: 14/242,323

(22) Filed: Apr. 1, 2014

(65) Prior Publication Data

US 2015/0278429 A1    Oct. 1, 2015

(51) Int. Cl.
*G06F 17/50* (2006.01)
*G03F 1/36* (2012.01)
*G03F 7/20* (2006.01)

(52) U.S. Cl.
CPC ............. *G06F 17/5081* (2013.01); *G03F 1/36* (2013.01); *G03F 7/70441* (2013.01); *G06F 2217/12* (2013.01); *Y02P 90/265* (2015.11)

(58) Field of Classification Search
CPC .............. G03F 1/36; G03F 1/70; G03F 7/70; G06F 17/5081; G06F 17/5068; G06F 19/00; G06F 17/50

USPC ..................................................... 716/52, 53
See application file for complete search history.

(56) References Cited

U.S. PATENT DOCUMENTS

| | | | |
|---|---|---|---|
| 6,238,830 B1 * | 5/2001 | Rangarajan et al. | 430/30 |
| 7,249,342 B2 | 7/2007 | Pack et al. | |
| 7,694,267 B1 * | 4/2010 | Ye et al. | 716/53 |
| 2008/0124906 A1 * | 5/2008 | Moon | 438/584 |
| 2011/0271239 A1 * | 11/2011 | Lu et al. | 716/55 |
| 2012/0183891 A1 * | 7/2012 | Minamide et al. | 430/5 |

* cited by examiner

*Primary Examiner* — Vuthe Siek
(74) *Attorney, Agent, or Firm* — Haynes and Boone, LLP

(57) ABSTRACT

Provided is an integrated circuit (IC) manufacturing method. The method includes receiving a design layout of an IC, the design layout having a main feature; performing a process correction to the main feature thereby generating a modified main feature; using a computer, generating a simulated contour of the modified main feature, the simulated contour having a plurality of points; generating a plurality of assistant data in computer readable format, wherein each assistant data includes at least one process performance factor associated with one of the points; and keeping the simulated contour and the assistant data for use by a further process stage, such as mask making, mask inspection, mask repairing, wafer direct writing, wafer inspection, and wafer repairing.

17 Claims, 5 Drawing Sheets

SYSTEM AND METHOD FOR INTEGRATED CIRCUIT MANUFACTURING

BACKGROUND

The semiconductor integrated circuit (IC) industry has experienced rapid growth. In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs. Such scaling down has also increased the complexity of processing and manufacturing ICs and, for these advances to be realized, similar developments in IC manufacturing are needed.

As IC technologies are continually progressing to smaller technology nodes, simply scaling down similar designs used at larger nodes often results in inaccurate or poorly shaped device features. For example, rounded corners on a device feature that is designed to have right-angle corners may become more pronounced or more critical in the smaller nodes, preventing the device from performing as desired. Other examples of inaccurate or poorly shaped device features include pinching, necking, bridging, dishing, erosion, metal line thickness variations, and other characteristics that affect device performance.

Typically, optical proximity correction (OPC) may be performed on a design pattern to help alleviate some of these difficulties before the design pattern is used in later operations in an IC manufacturing process, such as an operation creating a mask or a photolithography process exposing wafers. OPC may modify shapes of the design pattern and/or insert assist features (AF) based on simulated IC manufacturing processes. Improvements in an IC manufacturing process involving OPC are desired.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

Figure 1:
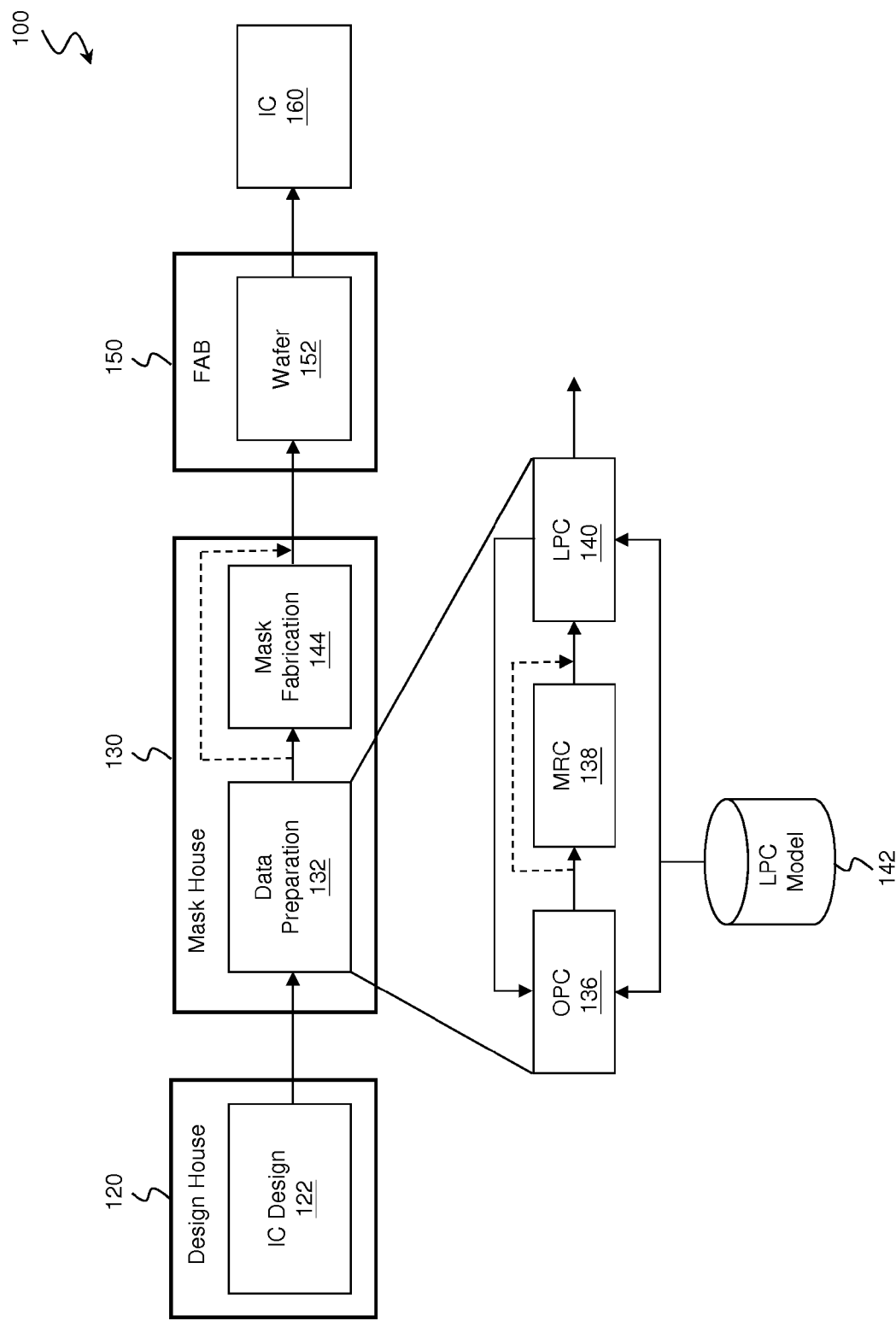
FIG. 1 is a simplified block diagram of an embodiment of an integrated circuit (IC) manufacturing system and an associated IC manufacturing flow.

It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the performance of a first process before a second process in the description that follows may include embodiments in which the second process is performed immediately after the first process, and may also include embodiments in which additional processes may be performed between the first and second processes. Various features may be arbitrarily drawn in different scales for the sake of simplicity and clarity. Furthermore, the formation of a first feature over or on a second feature in the description that follows may include embodiments in which the first and second features are formed in direct contact, and may also include embodiments in which additional features may be formed between the first and second features, such that the first and second features may not be in direct contact.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. For example, if the device in the figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

FIG. 1 is a simplified block diagram of an embodiment of an integrated circuit (IC) manufacturing system 100 and an IC manufacturing flow associated with the IC manufacturing system. The IC manufacturing system 100 includes a plurality of entities, such as a design house (or design team) 120, a mask house (or mask team) 130, and an IC manufacturer (or fab) 150, that interact with one another in the design, development, and manufacturing cycles and/or services related to manufacturing an integrated circuit (IC) device 160. The plurality of entities are connected by a communications network, which may be a single network or a variety of different networks, such as a private intranet and/or the Internet, and may include wired and/or wireless communication channels. Each entity may interact with other entities and may provide services to and/or receive services from the other entities. One or more of the design house 120, the mask house 130, and the IC manufacturer 150 may be owned by a single larger company, and may even coexist in a common facility and use common resources.

The design house 120 generates an IC design layout 122. The IC design layout 122 includes various geometrical patterns designed for an IC product, based on a specification of the IC product to be manufactured. The geometrical patterns correspond to patterns of metal, oxide, or semiconductor layers that make up the various components of the IC device 160 to be fabricated. The various layers combine to form various IC features. For example, a portion of the IC design layout 122 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. The design house 120 implements a proper design procedure to form the IC design layout 122. The design procedure may include logic design, physical design, and/or place and route. The IC design layout 122 is presented in one or more data files having information of the geometrical patterns. For example, the IC design layout 122 can be expressed in a GDSII file format or DFII file format.

The mask house 130 uses the IC design layout 122 to manufacture one or more masks to be used for fabricating the various layers of the IC device 160 according to the IC design layout 122. The mask house 130 performs data preparation 132, where the IC design layout 122 is translated into a form that can be physically written by a mask writer, and mask fabrication 144, where the design layout prepared by the data preparation 132 is modified to comply with a particular mask writer and/or mask manufacturer and is then fabricated. In the present embodiment, data preparation 132 and mask fabrication 144 are illustrated as separate element, however, data preparation 132 and mask fabrication 144 can be collectively referred to as mask data preparation. In an embodiment, the IC manufacturing system 100 may employ a maskless lithography technology, such as electron beam lithography or optical maskless lithography. In such a system, mask fabrication 144 is bypassed, and the IC design layout 122 is modified by data preparation 132 suitable for wafer handling with the particular maskless lithography technology.

Data preparation 132 includes an optical proximity correction (OPC) 136, a mask rule checker (MRC) 138 and a lithography process checker (LPC) 140. OPC 136 uses lithography enhancement techniques to compensate for image errors, such as those that can arise from diffraction, interference, or other process effects. OPC 136 may add assist features, such as scattering bars, serif, and/or hammerheads to the IC design layout 122 according to optical models or rules such that, after a lithography process, a final pattern on a wafer is improved with enhanced resolution and precision. OPC 136 may employ model-based correction or rule-based correction. Data preparation 132 may include further resolution enhancement techniques, such as off-axis illumination, sub-resolution assist features, phase-shifting masks, other suitable techniques, or combinations thereof.

If a mask is to be fabricated, MRC 138 is invoked to check the IC design layout 122 that has undergone processes in OPC 136 with a set of mask creation rules which may contain certain geometric and connectivity restrictions to ensure sufficient margins and to account for variability in semiconductor manufacturing processes. MRC 138 may modify the IC design layout 122 to compensate for limitations during mask fabrication 144.

LPC 140 simulates lithography processing that will be implemented by the IC manufacturer 150 to fabricate the IC device 160. LPC 140 simulates this processing based on the IC design layout 122 to create a simulated manufactured device, such as the IC device 160. In an embodiment, LPC 140 determines what shape a hypothetical photomask having a feature thus modified by OPC 136 and MRC 138 would produce on a wafer if the photomask was exposed by a lithography tool described by the LPC models (or rules) 142. A simulated shape is called a contour. The simulated manufactured device includes simulated contours of all or a portion of the IC design layout 122. The LPC models (or rules) 142 may be based on actual processing parameters of the IC manufacturer 150. The processing parameters can include parameters associated with various processes of the IC manufacturing cycle, parameters associated with tools used for manufacturing the IC, and/or other aspects of the manufacturing process. LPC 140 takes into account various process performance factors, such as intensity log slope (ILS), depth of focus (DOF), mask error enhancement factor (MEEF), data error enhancement factor (DEEF) in a maskless lithography, other suitable factors, or combinations thereof.

After a simulated manufactured device has been created by LPC 140, if the simulated device is not close enough in shape to satisfy design rules, certain steps in data preparation 132, such as OPC 136 and MRC 138, may be repeated to refine the IC design layout 122 further.

It should be understood that the above description of data preparation 132 has been simplified for the purposes of clarity, and data preparation 132 may include additional features such as a logic operation (LOP) to modify the IC design layout according to manufacturing rules, a Resolution Enhancement Technology (RET) to modify the IC design layout to compensate for limitations in lithography processes used by the IC manufacturer 150. Additionally, the processes applied to the IC design layout 122 during data preparation 132 may be executed in a variety of different orders.

Data preparation 132 thus modifies the design layout 122 suitable for later operations in the IC manufacturing system 100. The results from data preparation 132 are represented in one or more data files, such as a file in a GDSII file format or DFII file format. The one or more data files include information of geometrical patterns, such as polygons representing main design patterns and/or assist features. In the present embodiment, the one or more data files further include assistant data that has been produced by data preparation 132. The assistant data will be used to enhance various operations of the IC manufacturing system 100, such as mask fabrication 144 by the mask house 130 and wafer exposure by the IC manufacturer 150. Generation and application of the assistant data will be discussed in greater detail in later sections of the present disclosure.

After data preparation 132 and during mask fabrication 144, a mask or a group of masks are fabricated based on the modified IC design layout. For example, an electron-beam (e-beam) or a mechanism of multiple e-beams is used to form a pattern on a mask (photomask or reticle) based on the modified IC design layout. The mask can be formed in various technologies. In an embodiment, a mask pattern includes opaque regions and transparent regions. A radiation beam, such as an ultraviolet (UV) beam, used to expose the image sensitive material layer (e.g., photoresist) coated on a wafer, is blocked by the opaque region and transmits through the transparent regions. In one example, a binary mask includes a transparent substrate (e.g., fused quartz) and an opaque material (e.g., chromium) coated in the opaque regions of the mask. In another example, the mask is formed using a phase shift technology. In the phase shift mask (PSM), various features in the pattern formed on the mask are configured to have proper phase difference to enhance the resolution and imaging quality. In various examples, the phase shift mask can be attenuated PSM or alternating PSM as known in the art. In an embodiment, the mask is an extreme ultraviolet (EUV) mask which is a reflective mask in that some portions of its top surface reflect radiation projected thereon in forming an aerial image of IC patterns to be printed on a target, such as a wafer. The EUV mask may incorporate resolution enhancement techniques such as phase-shifting mask (PSM) and/or optical proximity correction (OPC).

After a mask is formed, mask fabrication 144 may include operations to ensure quality of the mask and to gather information for enhancing the mask fabrication process. For example, mask fabrication 144 may inspect the mask for imperfections based on the modified IC design layout and may repair the mask if the imperfections exceed certain limitations. In the present embodiment, mask fabrication 144 utilizes the assistant data produced by data preparation 132 for such tasks. This aspect will be discussed in greater detail in a later section of the present disclosure.

The IC manufacturer 150, such as a semiconductor foundry, uses the mask (or masks) fabricated by the mask house 130 to fabricate the IC device 160. Alternatively, the IC manufacturer 150 may use data prepared by the mask house 130 to fabricate the IC device 160 using some maskless lithography technology, such as electron beam direct write (EBDW) lithography. The IC manufacturer 150 is an IC fabrication business that can include a myriad of manufacturing facilities for the fabrication of a variety of different IC products. For example, there may be a manufacturing facility for the front end fabrication of a plurality of IC products (i.e., front-end-of-line (FEOL) fabrication), while a second manufacturing facility may provide the back end fabrication for the interconnection and packaging of the IC products (i.e., back-end-of-line (BEOL) fabrication), and a third manufacturing facility may provide other services for the foundry business. In the present embodiment, a semiconductor wafer is fabricated using the mask (or masks) to form the IC device 160. The semiconductor wafer includes a silicon substrate or other proper substrate having material layers formed thereon. Other proper substrate materials include another suitable elementary semiconductor, such as diamond or germanium; a suitable compound semiconductor, such as silicon carbide, indium arsenide, or indium phosphide; or a suitable alloy semiconductor, such as silicon germanium carbide, gallium arsenic phosphide, or gallium indium phosphide. The semiconductor wafer may further include various doped regions, dielectric features, and multilevel interconnects (formed at subsequent manufacturing steps). The mask may be used in a variety of processes. For example, the mask may be used in an ion implantation process to form various doped regions in the semiconductor wafer, in an etching process to form various etching regions in the semiconductor wafer, and/or other suitable processes.

After the semiconductor wafer is exposed with the mask (or without a mask in a maskless lithography), the IC manufacturer 150 generally performs additional operations to ensure quality of the wafer production. For example, the IC manufacturer 150 may inspect the wafer for imperfections based on the modified IC design layout produced by data preparation 132. In the present embodiment, the IC manufacturer 150 utilizes the assistant data produced by data preparation 132 for such tasks. This aspect will be discussed in greater detail in a later section of the present disclosure.

Figure 2:
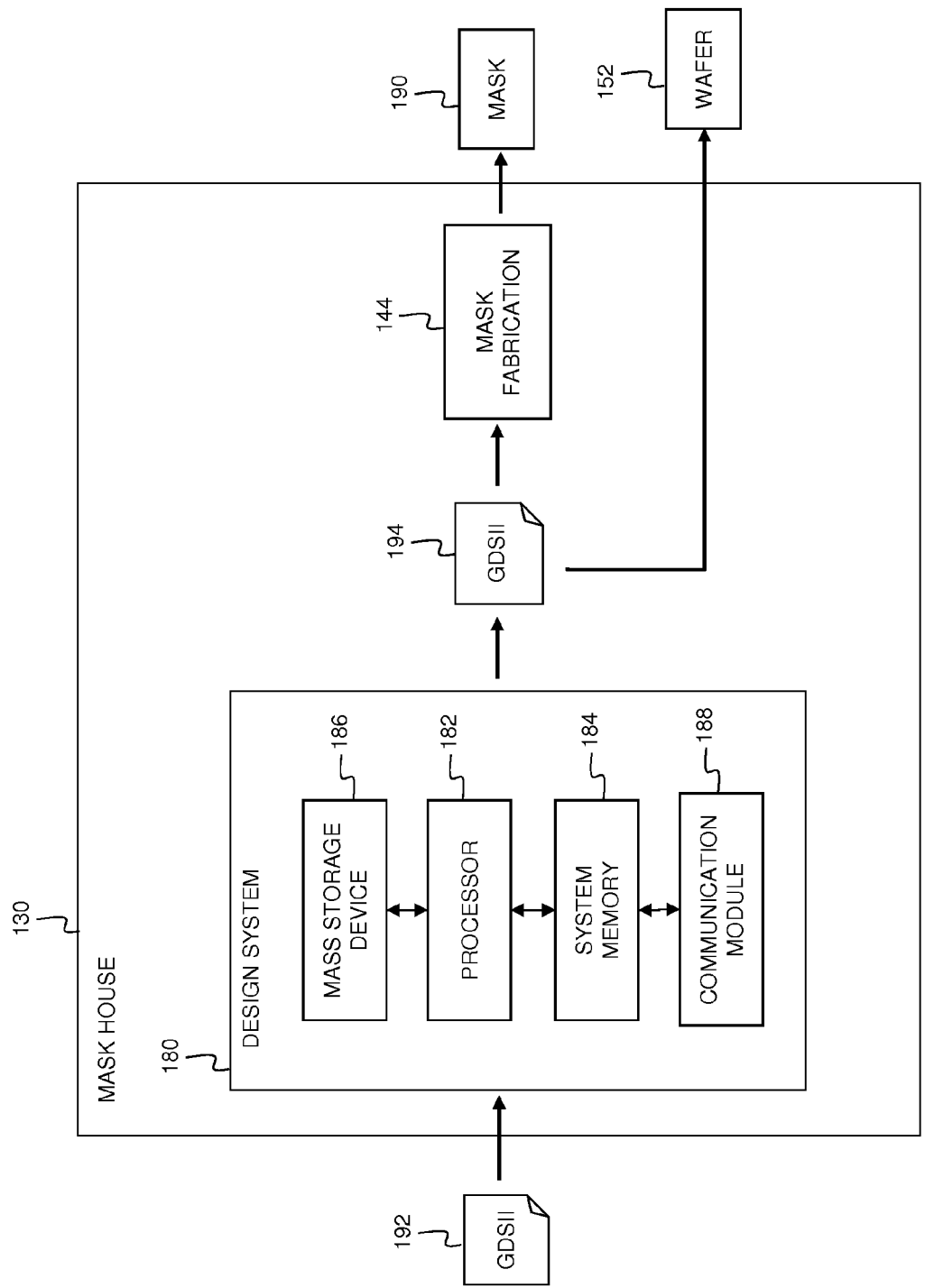
FIG. 2 is a more detailed block diagram of the mask house shown in FIG. 1 according to various aspects of the present disclosure.

FIG. 2 is a more detailed block diagram of the mask house 130 shown in FIG. 1 according to various aspects of the present disclosure. In the illustrated embodiment, the mask house 130 includes a design system 180 that is operable to perform the functionality described in association with data preparation 132 of FIG. 1. The design system 180 is an information handling system such as a computer, server, workstation, or other suitable device. The system 180 includes a processor 182 that is communicatively coupled to a system memory 184, a mass storage device 186, and a communication module 188. The system memory 184 provides the processor 182 with non-transitory, computer-readable storage to facilitate execution of computer instructions by the processor. Examples of system memory may include random access memory (RAM) devices such as dynamic RAM (DRAM), synchronous DRAM (SDRAM), solid state memory devices, and/or a variety of other memory devices known in the art. Computer programs, instructions, and data are stored on the mass storage device 186. Examples of mass storage devices may include hard discs, optical disks, magneto-optical discs, solid-state storage devices, and/or a variety other mass storage devices known in the art. The communication module 188 is operable to communicate information such as IC design layout files with the other components in the IC manufacturing system 100, such as design house 120. Examples of communication modules may include Ethernet cards, 802.11 WiFi devices, cellular data radios, and/or other suitable devices known in the art.

In operation, the design system 180 is configured to manipulate the IC design layout 122 according to a variety of design rules and limitations before it is transferred to a mask 190 by mask fabrication 144, or transferred to wafer 152 by the IC manufacturer 150. For example, in an embodiment, data preparation 132 may be implemented as software instructions executing on the design system 180. In such an embodiment, the design system 180 receives a first GDSII file 192 containing the IC design layout 122 from the design house 120. After data preparation 132 completes, the design system 180 transmits a second GDSII file 194 containing a modified IC design layout to mask fabrication 144. In alternative embodiments, the IC design layout may be transmitted between the components in IC manufacturing system 100 in alternate file formats such as DFII, CIF, OASIS, or any other suitable file type. In the present embodiment, in addition to the modified IC design layout, the design system 180 also transmits one or more files containing assistant data associated with the modified IC design layout to mask fabrication 144. In an embodiment, the assistant data includes MEEF data which may be used by mask fabrication 144 for inspecting and repairing masks. It is understood that the design system 180 and the mask house 130 may include additional and/or different components in alternative embodiments.

Figure 3:
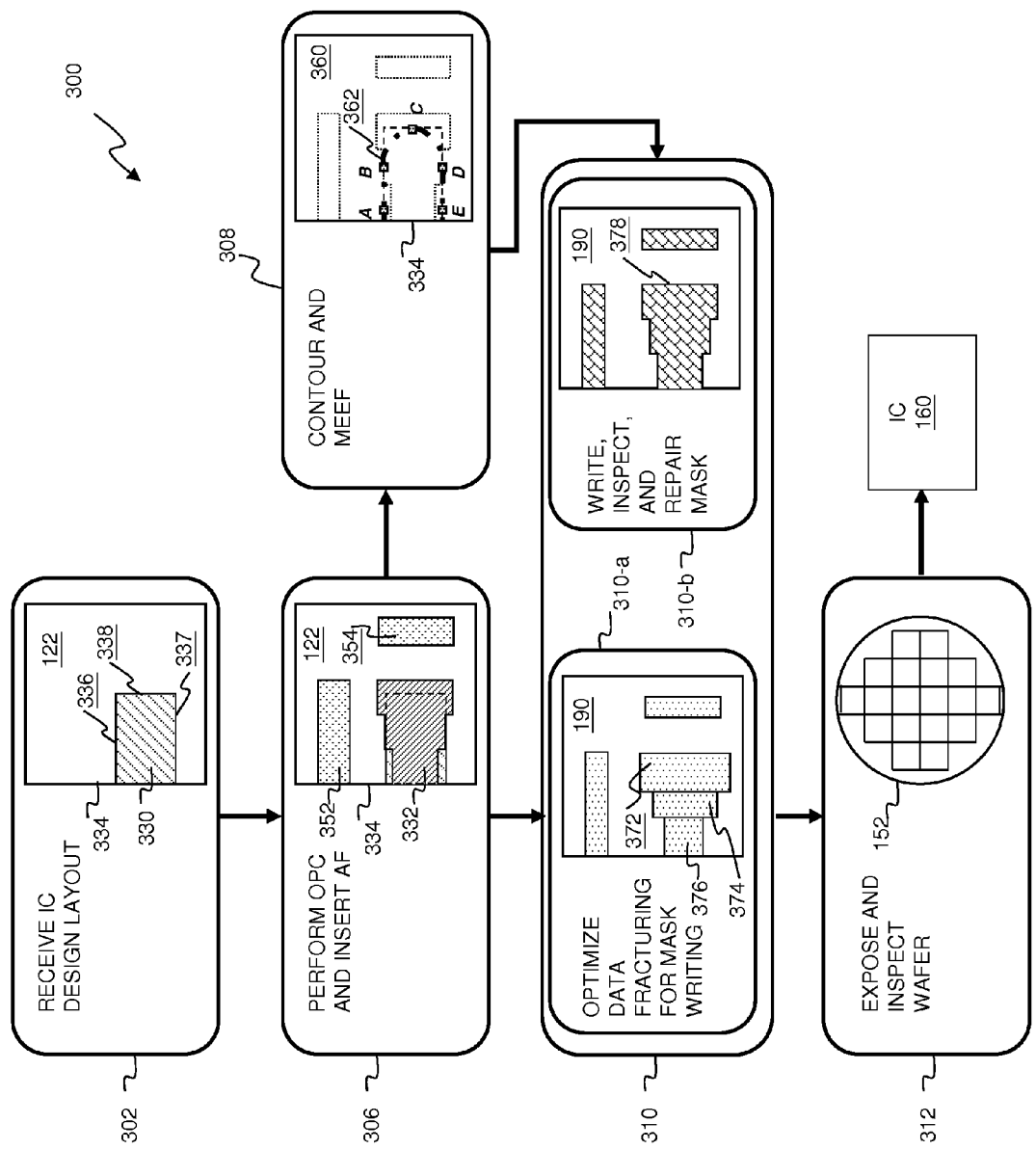
FIG. 3 is a flow of carrying assistant data from IC design layout correction to mask fabrication according to various aspects of the present disclosure.

FIG. 3 is a high-level view of an embodiment of an IC manufacturing flow 300 according to various aspects of the present disclosure. In an embodiment, the IC manufacturing flow 300 is implemented in various components of the IC manufacturing system 100, particularly, in data preparation 132 and mask fabrication 144 of the mask house 130, as shown in FIG. 1.

The flow 300 (FIG. 3) begins at operation 302 where the mask house 130 receives an IC design layout 122 from the design house 120 (FIG. 1) in a process of manufacturing an IC 160. The IC design layout 122 includes various geometrical patterns representing features of the IC 160. In the present embodiment, the IC design layout 122 includes a main pattern 330 which may be part of an active or passive circuit component, such as a metal line. The main pattern 330 is a rectangular feature that forms a right angle with a boundary line 334. The main pattern 330 includes three edges, 336, 337 and 338, that are isolated from other features. Ideally, when the main pattern 330 is formed on a wafer for fabricating the IC 160, it will maintain the same shape, but this is not always so due to limitations in various manufacturing processes.

The flow 300 (FIG. 3) proceeds to operation 306 where an OPC operation is performed to modify the shape of the main pattern 330. In the present embodiment, operation 306 also inserts assist features 352 and 354 to the IC design layout 122. Assist features, 352 and 354, are sub-resolution features that are placed on a mask adjacent to the main pattern 330 to counter proximity effects and to reduce distortion of the main pattern 330. In the present embodiment, assist features 352 and 354 are edge scattering bars. It is understood that operation 306 may insert other assist features or does not insert any assist feature without limiting the inventive scope of the present disclosure. Operation 306 performs an OPC to modify the shape of an IC feature, such as the main pattern 330, to compensate for diffraction or other process effects so that the shape of the feature as formed in the final integrated circuit 160 closely matches the shape of the feature in the IC design layout 122. When inserting assist features and modifying the shape of the IC feature, operation 306 considers various factors associated with an IC manufacturing process, such as intensity log slope (ILS), depth of focus (DOF), mask error enhancement factor (MEEF), data error enhancement factor (DEEF), other suitable factors, or combinations thereof. In an embodiment, operation 306 includes an iterative process, such as a process including the OPC 136, MRC 138, and LPC 140 as shown in FIG. 1. During the iterative process, at least part of an IC feature boundary is modified and thereafter a simulation is performed to generate contours. Such process repeats until the simulated contours meet a target boundary. In the present embodiment as illustrated in FIG. 3, parts of boundaries of the main pattern 330 are modified such that a simulated contour 362, as shown in operation 308 (FIG. 3), meets a target boundary as defined by an outer boundary of the main pattern 330. The main pattern 330 has thus become a modified main pattern 332 by operation 306.

The flow 300 proceeds to operation 308 where assistant data associated with the modified main pattern 332 is generated and saved in a format suitable for use by another operation in the IC manufacturing flow, such as operation 310 in FIG. 3. In the present embodiment, the assistant data is saved to a file 360 that includes the contour 362 and a set of Mask Error Enhancement Factor (MEEF) data that are associated with various points, A, B, C, D and E, on the contour 362. For simplicity purposes, a MEEF data at a contour point A is referred to as MEEF data A. Where confusion may arise, a specific reference to either a MEEF data or a contour point will be made. A MEEF data is generally a magnification factor of imaging errors when fabricating a wafer using a mask that contains imperfections or errors. For example, a MEEF data of 3 indicates that a 10-nanometer error on a mask pattern will produce a 30-nanometer error on a wafer pattern. It is understood that magnification factors of a lithography system also affect how a mask pattern error transfers to a wafer pattern error. In addition, the mask/wafer pattern error may be a critical dimension (CD) error or a contour edge positioning error. The MEEF data associated with various points on the contour 362 may be substantially different. In the present embodiment, MEEF data A, B, D and E are about 1.3, while MEEF data C is about 2.5. In another word, mask pattern fidelity at or near the contour point C is more critical than mask pattern fidelity at or near the contour points A, B, D and E. In an embodiment, the contour 362 and the set of MEEF data, A-E, may be part of results produced by the iterative process of operation 306. In another embodiment, operation 308 generates the contour 362 and the set of MEEF data, A-E, based on patterns/features produced by operation 306 with additional lithography performance factors.

The flow 300 proceeds to operation 310 where a mask (or a group of masks) 190 is fabricated based on the modified IC design layout 122. For example, an electron-beam (e-beam) or a mechanism of multiple e-beams is used to form a pattern on a mask (photomask or reticle) based on the modified IC design layout 122, including the modified main pattern 332 and the assist features 352 and 354. In the present embodiment, in addition to the modified design layout 122, the file 360 is also used by operation 310, for example, to optimize data fracturing before the mask 190 is fabricated, and to inspect/repair the mask 190 after it has been fabricated.

As shown in FIG. 3, a sub-operation 310-a performs data fracturing as a mask data preparation step, where complex polygons are translated into simpler shapes that can be handled by mask writing hardware. For example, the modified main pattern 332 can be translated into three rectangles, 372, 374, and 376. As there are many possibilities in translating a complex pattern into simpler shapes, the file 360 is used by the sub-operation 310-a in reaching some optimal solution. As discussed in reference to operation 308, the contour 362 and the MEEF data A-E in the file 360 indicates that contour point C has greater capability of transferring pattern fidelity errors to a wafer 152 than contour points A, B, D, and E. Therefore, the data fracturing should favor a solution that provides a better pattern fidelity at contour point C.

As shown in FIG. 3, a sub-operation 310-b performs wafer inspection and repair after the wafer 190 has been fabricated. Since the contour 362 and the MEEF data A-E in the file 360 indicate which part(s) of the mask 190 has greater capability of transferring pattern fidelity errors to a wafer 152, those part(s) shall be subject to more thorough inspection. For example, a mask edge 378 that corresponds to contour point C shall be inspected more thoroughly than other edges of the same pattern. In this regard, the file 360 serves to improve efficiency of the mask inspection process. In addition, sub-operation 310-b may repair the mask 190 to reduce pattern fidelity errors using the file 360 as a guide thereby improving quality of the mask 190.

The flow 300 proceeds to operation 312 where the mask 190 is used to expose the wafer 152 and to produce the integrated circuit 160 having the main pattern 330.

Figure 4:
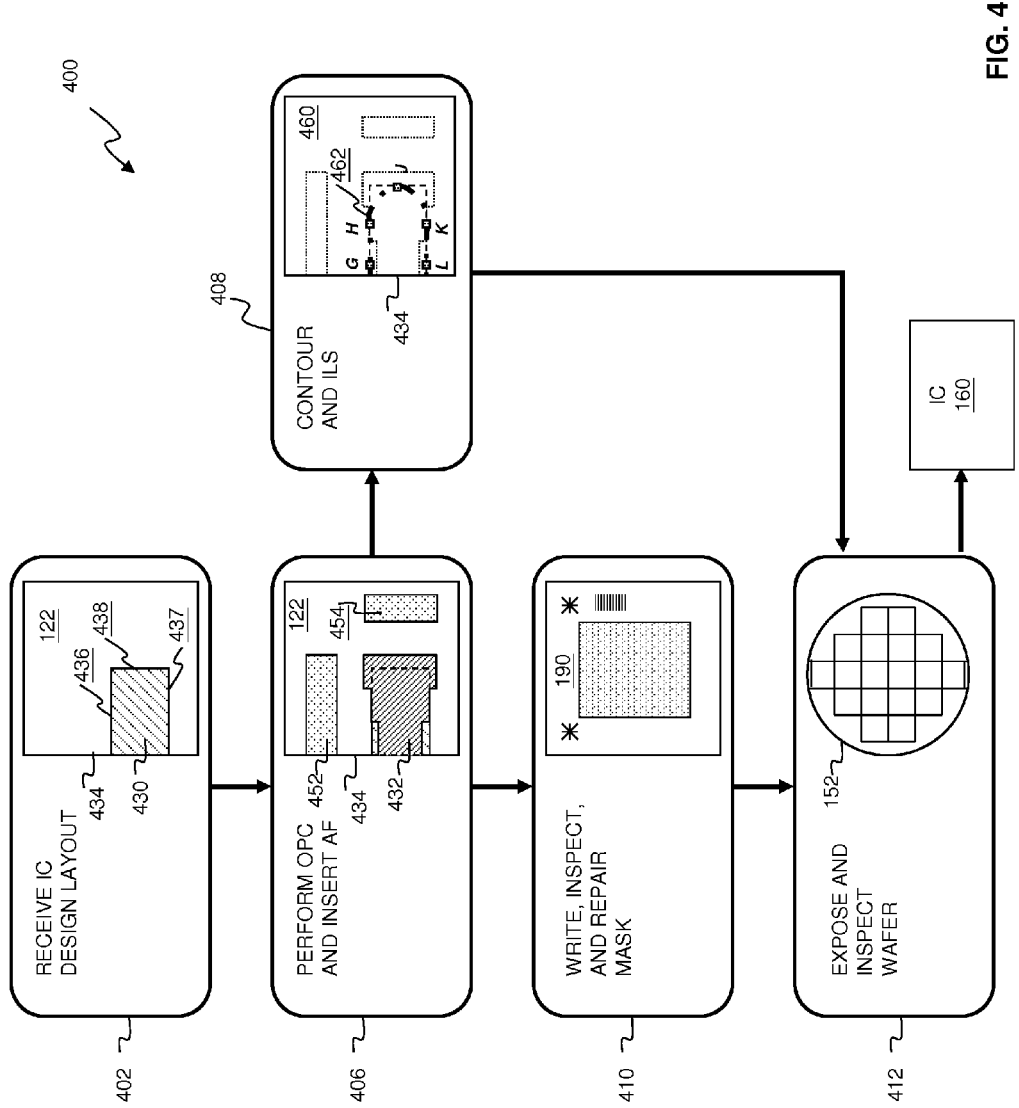
FIG. 4 is a flow of carrying assistant data from IC design layout correction to wafer exposure according to various aspects of the present disclosure.

FIG. 4 is a high-level view of an embodiment of another IC manufacturing flow 400 according to various aspects of the present disclosure. In an embodiment, the IC manufacturing flow 400 may be implemented in various components of the IC manufacturing system 100, particularly in data preparation 132 by the mask house 130 and wafer exposure by the IC manufacturer 150, as shown in FIG. 1. Some operations of the flow 400 may be similar to those of the flow 300. For simplicity purposes, reference numerals and/or letters are repeated in FIGS. 3 and 4. However, it is understood that such repetition is for the purpose of simplicity and clarity and does not in itself dictate a relationship between the embodiments 300 and 400.

The flow 400 (FIG. 4) begins at operation 402 where the mask house 130 receives an IC design layout 122 from the design house 120 (FIG. 1) in a process of manufacturing an IC 160. The IC design layout 122 includes a main pattern 430 of the IC 160. In the present embodiment, the main pattern 430 is similar to the main pattern 330 (FIG. 3) for illustrative purposes, without limiting the inventive scope of the present disclosure.

The flow 400 (FIG. 4) proceeds to operation 406 which is similar to operation 306 (FIG. 3). In the present embodiment, operation 406 performs OPC to the main pattern 430 thereby generating a modified main pattern 432. Operation 406 further inserts assist features, 452 and 454.

The flow 400 (FIG. 4) proceeds to operation 408 to generate assistant data associated with the modified main pattern 432 in a format suitable for use by another operation, such as operation 412 in FIG. 4. In the present embodiment, the assistant data is saved to a file 460 that includes a simulated contour 462 of the modified main pattern 432 and a set of Intensity Log Slope (ILS) data that are associated with various points, G, H, J, K and L, on the contour 462. For simplicity purposes, an ILS data at a contour point G is referred to as ILS data G. Where confusion may arise, a specific reference to either an ILS data or a contour point will be made. An ILS data generally indicates how smooth an edge of a pattern will be when the pattern is exposed and formed on a wafer. In the present embodiment, a larger ILS data corresponds to a smoother edge. ILS data associated with various points on the contour 462 may be substantially different. In the present embodiment, ILS data G is about 35, while ILS data J is about 21. In another word, when the main pattern 430 is formed into a wafer using the modified main pattern 432, its edge 438 may be rougher than its edges 436 and 437. In an embodiment, the contour 462 and the set of ILS data, G-L, may be part of results produced by the iterative process of operation 406. In another embodiment, operation 408 generates the contour 462 and the set of ILS data, G-L, based on patterns/features produced by operation 406 with additional lithography performance factors.

The flow 400 (FIG. 4) proceeds to operation 410 where a mask (or a group of masks) 190 is fabricated based on the modified IC design layout 122. For example, an electron-beam (e-beam) or a mechanism of multiple e-beams is used to form a pattern on a mask (photomask or reticle) based on the modified IC design layout 122, including the modified main pattern 432 and the assist features 452 and 454.

The flow 400 (FIG. 4) proceeds to operation 412 where the mask 190 is used to expose a wafer 152 and to produce the IC 160 having the main pattern 430. In the present embodiment, the file 460 is also used by operation 412, for example, to inspect the exposed wafer 152. As discussed in reference to operation 408, the contour 462 and the ILS data G-L in the file 460 indicate which part(s) of the exposed wafer 152 is more susceptible to pattern edge roughness than other parts of the exposed wafer 152 and therefore shall be subject to more thorough inspection for defects. Wafer inspection may also generate information for improving the overall lithography process. In this regard, the file 460 serves to improve manufacturing quality of the IC 160. In another embodiment, operation 412 uses the file 460 to adjust wafer exposure process parameters thereby to improve wafer fabrication quality.

In some embodiments of the IC manufacturing system 100, the IC manufacturing flows 300 and 400 may be combined. Moreover, other process performance factors associated with mask fabrication 144 by the mask house 130 and/or wafer exposure by the IC manufacturer 150, such as Depth of Focus (DoF), may be used in generating assistant data that are annotated onto simulated contours of main patterns. For example, the DOF information represents which pattern or which part of a pattern is susceptible to defocusing errors while exposing a wafer. Such information can be used in wafer exposure and wafer inspection for improving wafer fabrication quality.

Figure 5:
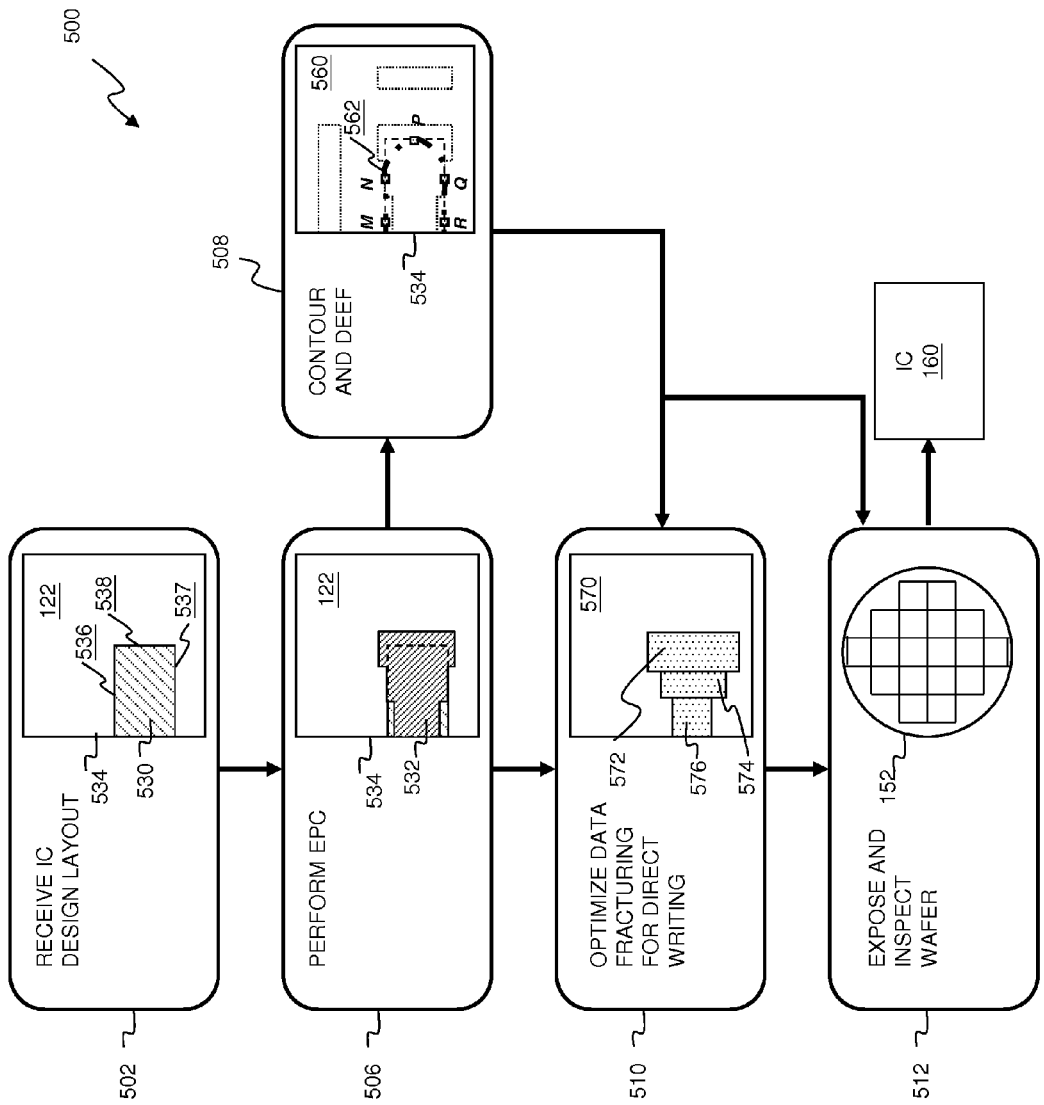
FIG. 5 is a flow of carrying assistant data from IC design layout correction to maskless wafer exposure according to various aspects of the present disclosure.

FIG. 5 is a high-level view of an embodiment of another IC manufacturing flow 500 according to various aspects of the present disclosure. In an embodiment, the IC manufacturing flow 500 may be implemented in various components of the IC manufacturing system 100, particularly in data preparation 132 by the mask house 130 and wafer exposure by the IC manufacturer 150, as shown in FIG. 1, using a maskless lithography technology. Some operations of the flow 500 may be similar to those of the flows 300 and 400. For simplicity purposes, reference numerals and/or letters are repeated. However, it is understood that such repetition is for the purpose of simplicity and clarity and does not in itself dictate a relationship between the embodiments 300, 400 and 500.

The flow 500 (FIG. 5) begins at operation 502 where an IC design layout 122 is received from the design house 120 (FIG. 1) in a process of manufacturing an IC 160. The IC design layout 122 includes a main pattern 530 of the IC 160. In the present embodiment, the main pattern 530 is similar to the main patterns 330 (FIG. 3) and 430 (FIG. 4) for illustrative purposes, without limiting the inventive scope of the present disclosure.

The flow 500 (FIG. 5) proceeds to operation 506 where the design layout 122 is modified to compensate for variations in a maskless lithography process, such as a lithography process using electron beam (e-beam) or ion beam. In the present embodiment, operation 506 performs e-beam proximity correction (EPC) to the main pattern 530 thereby generating a modified main pattern 532. Many aspects of operation 506 are similar to the operations 306 (FIG. 3) and 406 (FIG. 4). In alternative embodiments, process correction suitable for other maskless lithography processes may be performed by operation 506.

The flow 500 (FIG. 5) proceeds to operation 508 to generate assistant data associated with the modified IC design layout 122 in a format suitable for use by another operation, such as operation 512 in FIG. 5. In the present embodiment, the assistant data is saved to a file 560 that includes a simulated contour 562 of the modified main pattern 532 and a set of Data Error Enhancement Factor (DEEF) data that are associated with various points, M, N, P, Q and R, on the contour 562. For simplicity purposes, a DEEF data at a contour point M is referred to as DEEF data M. Where confusion may arise, a specific reference to either a DEEF data or a contour point will be made. A DEEF data is generally a magnification factor of data-related imaging errors, such as blanking errors and shaping errors, when transferring a pattern to a wafer using a direct beam writer, such as an e-beam writer. For example, a DEEF data of 3 indicates that a 10 nanometer error on a pattern will produce a 30 nanometer error on a wafer. DEEF data associated with various points on the contour 562 may be substantially different. In the present embodiment, DEEF data M, N, Q and R are about 1.3, while DEEF data P is about 2.5. In another word, pattern fidelity at or near contour point P is more critical than pattern fidelity at or near contour points M, N, Q and R. In an embodiment, the contour 562 and the set of DEEF data, M-R, may be part of results produced by the iterative process of operation 506. In another embodiment, operation 508 generates the contour 562 and the set of DEEF data, M-R, based on patterns/features produced by operation 506 with additional lithography performance factors.

The flow 500 (FIG. 5) proceeds to operation 510 where data fracturing is performed as a preparation step for a maskless lithography process such as an e-beam direct writing. For example, the main pattern 532 may be translated into three rectangles 572, 574, and 576, among other translation possibilities. Similar to the discussion in sub-operation 310-a in reference to FIG. 3, operation 510 uses the contour 562 and the DEEF data, M-R, in reaching some optimal solution for the data fracturing.

The flow 500 (FIG. 5) proceeds to operation 512 where the modified layout 122 is used to expose a wafer 152 in the maskless lithography process. In the present embodiment, the file 560 is also used by operation 512, for example, to inspect the exposed wafer 152. As discussed in reference to operation 508, the contour 562 and the DEEF data M-R in the file 560 indicate which part(s) of the exposed wafer 152 is more susceptible to pattern fidelity error than other parts of the exposed wafer 152 and therefore shall be subject to more thorough inspection for defects. Wafer inspection may also generate information for improving the overall lithography process. In this regard, the file 560 serves to improve manufacturing quality of the IC 160.

According to various aspects of the present disclosure, embodiments of IC manufacturing flows can utilize assistant data generated in preparation for mask or wafer fabrication. These IC manufacturing flows generally provide enhanced quality in mask and wafer fabrication, as well as improved efficiency in mask or wafer defect isolation.

Further, the operation of generating a simulated contour of a main pattern and associating the simulated contour with assistant data, such as MEEF, ILS, DOF, and DEEF data, as illustrated in operations 306 (FIG. 3), 406 (FIG. 4) and 506 (FIG. 5), is designed to be executed on any computing architecture, such as the design system 180 described in association with FIG. 2. For example, the operations 306, 406, and 506 may be executed on a single computer, local area networks, client-server networks, wide area networks, internets, hand-held and other portable and wireless devices and networks. Such architecture can take the form of an entirely hardware embodiment, an entirely software embodiment, or an embodiment containing both hardware and software elements. Hardware generally includes at least processor-capable platforms, such as client-machines (also known as personal computers or servers), and hand-held processing devices (such as smart phones, personal digital assistants (PDAs), or personal computing devices (PCDs), for example. Hardware can include any physical device that is capable of storing machine-readable instructions, such as memory or other data storage devices. Other forms of hardware include hardware sub-systems, including transfer devices such as modems, modem cards, ports, and port cards, for example. Software generally includes any machine code stored in any memory medium, such as RAM or ROM, and machine code stored on other devices (such as floppy disks, flash memory, or a CDROM, for example). Software can include source or object code, for example. In addition, software encompasses any set of instructions capable of being executed in a client machine or server.

Furthermore, embodiments of the present disclosure can take the form of a computer program product accessible from a tangible computer-usable or computer-readable medium providing program code for use by or in connection with a computer or any instruction execution system. For the purposes of this description, a tangible computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, a semiconductor system (or apparatus or device), or a propagation medium.

Data structures are defined organizations of data that may enable an embodiment of the present disclosure. For example, a data structure may provide an organization of data, or an organization of executable code. Data signals could be carried across transmission mediums and store and transport various data structures, and, thus, may be used to transport an embodiment of the present disclosure.

In one exemplary aspect, the present disclosure is directed to an integrated circuit (IC) manufacturing method. The method includes receiving a design layout of an integrated circuit (IC), the design layout having a main feature. The method further includes performing a process correction to the main feature thereby generating a modified main feature. The method further includes using a computer, generating a simulated contour of the modified main feature, the simulated contour having a plurality of points. The method further includes generating a plurality of assistant data, wherein each of the assistant data includes at least one process performance factor associated with one of the points. The method further includes storing the simulated contour and the assistant data in a tangible computer-readable medium for use by a further IC process stage, such as mask making, mask inspection, mask repairing, wafer direct writing, wafer inspection, wafer repairing, or a combination thereof.

In another exemplary aspect, the present disclosure is directed to an integrated circuit (IC) manufacturing method. The method includes receiving a device, the device having a main feature of an integrated circuit (IC). The method further includes receiving a simulated contour of the main feature and a plurality of assistant data, wherein the simulated contour includes a plurality of points and each assistant data represents at least one process performance factor at one of the points on the simulated contour. The method further includes exposing an image on a substrate using the device and a lithography process and inspecting the image on the substrate using at least the plurality of assistant data.

In another exemplary aspect, the present disclosure is directed to an integrated circuit (IC) manufacturing system. The IC manufacturing system comprises a data preparation unit and a mask fabrication unit. The data preparation unit receives a design layout of an IC, the design layout having a main feature; using a computer, performs a data preparation process to the design layout thereby generating a modified main feature and a simulated contour of the modified main feature; and generates a plurality of assistant data in computer readable format, wherein each assistant data represents at least one process performance factor at a point on the simulated contour. The mask fabrication unit forms a mask using the IC design layout having the modified main feature and inspects the mask using the simulated contour and the plurality of assistant data.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
receiving a design layout of an integrated circuit (IC), the design layout having a main feature;

performing a process correction to the main feature thereby generating a modified main feature;

using a computer, generating a simulated contour of the modified main feature, the simulated contour having a plurality of points;

generating a plurality of assistant data, wherein each of the assistant data includes at least one process performance factor associated with one of the points;

storing the simulated contour and the assistant data in a tangible computer-readable medium for use by a further IC process stage that comprises a mask inspection process or a wafer inspection process;

forming a mask using the design layout with the modified main feature; and inspecting the mask using the simulated contour and the plurality of assistant data, wherein the at least one process performance factor includes MEEF, and wherein the inspecting of the mask includes:

identifying one of the points that is associated with a higher MEEF data than another one of the points; and inspecting a feature of the mask that corresponds to the one of the points more thoroughly than another feature of the mask that corresponds to the another one of the points.

2. The method of claim 1, wherein the process correction uses one of: optical proximity correction (OPC) and e-beam proximity correction (EPC).

3. The method of claim 1, wherein the process performance factor is one of: mask error enhancement factor (MEEF), intensity log slope (ILS), depth of focus (DOF), data error enhancement factor (DEEF), and a combination thereof.

4. The method of claim 1, further comprising, before the forming the mask:

performing a data fracturing process using the simulated contour and the plurality of assistant data, wherein the at least one process performance factor includes MEEF, and wherein the performing of the data fracturing process includes:

identifying one of the points that is associated with a higher MEEF data than another one of the points; and selecting a data fracturing solution that provides a better pattern fidelity at the one of the points than at the another one of the points.

5. The method of claim 1, wherein the process correction includes an optical proximity correction (OPC) process, a mask data fracturing process, a mask rule checking (MRC) process, a lithography process checking (LPC) process, or a combination thereof.

6. The method of claim 1, further comprising:
preparing data for a maskless lithography process using the design layout with the modified main feature.

7. The method of claim 1, further comprising:
exposing an image on a semiconductor wafer using the mask and a lithography process; and
inspecting the image on the semiconductor wafer using at least the plurality of assistant data.

8. The method of claim 1, further comprising:
fabricating an IC device on a semiconductor wafer using the design layout with the modified main feature; and
inspecting the IC device using at least the plurality of assistant data.

9. A method, comprising:
receiving a device, the device having a main feature of an integrated circuit (IC);
receiving a simulated contour of the main feature and a plurality of assistant data, wherein the simulated contour includes a plurality of points and each assistant data represents at least one process performance factor at one of the points on the simulated contour;
exposing an image on a semiconductor substrate using the device and a lithography process; and
inspecting the image on the semiconductor substrate using at least the plurality of assistant data, wherein the process performance factor includes intensity log slope (ILS), and wherein the inspecting of the image includes:

identifying one of the points that is associated with a lower ILS data than another one of the points; and inspecting a feature of the image that corresponds to the one of the points more thoroughly than another feature of the image that corresponds to the another one of the points.

10. The method of claim 9, wherein the process performance factor includes data error enhancement factor (DEEF), and wherein the inspecting of the image includes:
identifying one of the points that is associated with a higher DEEF data than another one of the points; and
inspecting a feature of the image that corresponds to the one of the points more thoroughly than another feature of the image that corresponds to the another one of the points.

11. The method of claim 9, wherein the semiconductor substrate is a wafer.

12. The method of claim 9, wherein the device is a design layout prepared for maskless lithography.

13. The method of claim 9, wherein the lithography process uses one of:
an ultraviolet (UV) lithography process;
an extreme ultraviolet (EUV) lithography process;
an electron beam lithography process; and
an ion beam lithography process.

14. An integrated circuit (IC) manufacturing system, comprising:
a data preparation unit; and
a mask fabrication unit;
wherein:
the data preparation unit is configured to:
receive a design layout of an IC, the design layout having a main feature;
using a computer, perform a data preparation process to the design layout thereby generating a modified main feature and a simulated contour of the modified main feature; and
generate a plurality of assistant data in computer readable format, wherein each assistant data represents at least one process performance factor at a point on the simulated contour; and
the mask fabrication unit is configured to:
form a mask using the IC design layout having the modified main feature; and
inspect the mask using the simulated contour and the plurality of assistant data, wherein the plurality of assistant data indicates one part of the mask has a greater capability of transferring pattern fidelity errors to a wafer than another part of the mask, and wherein the mask fabrication unit is configured to inspect the one part of the mask more thoroughly than the another part of the mask.

15. The IC manufacturing system of claim 14, wherein the process performance factor is one of: mask error enhancement factor (MEEF), intensity log slope (ILS), depth of focus (DOF), data error enhancement factor (DEEF), and a combination thereof.

16. The IC manufacturing system of claim 14, wherein the data preparation process includes:
   an optical proximity correction (OPC) process;
   a mask rule checking (MRC) process; and
   a lithography process checking (LPC) process.

17. The IC manufacturing system of claim 14, wherein the data preparation process includes a mask data fracturing process.

\* \* \* \* \*